United States Patent [19]

Spears et al.

[11] Patent Number: 6,087,789
[45] Date of Patent: Jul. 11, 2000

[54] HYBRID BRIDGE MAGNETIC DEFLECTION AMPLIFIER

[76] Inventors: Steven Spears, P.O. Box 579, San Dimas, Calif. 91773; David Walker, 731 Puma Canyon La., Glendora, Calif. 91740

[21] Appl. No.: 09/040,859

[22] Filed: Mar. 18, 1998

[51] Int. Cl.[7] .............................. G09G 1/04; H01J 29/70
[52] U.S. Cl. ......................... 315/397; 315/395; 315/403
[58] Field of Search .................................. 315/389, 395, 315/397, 403, 408

[56] References Cited

U.S. PATENT DOCUMENTS

| | | | |
|---|---|---|---|
| 3,983,452 | 9/1976 | Bazin . | |
| 4,164,688 | 8/1979 | Cushing | 315/389 |
| 4,262,235 | 4/1981 | Neves et al. . | |
| 4,314,184 | 2/1982 | Ryan | 315/408 |

*Primary Examiner*—Edward P. Westin
*Assistant Examiner*—Nikita Wells
*Attorney, Agent, or Firm*—Blakely Sokoloff Taylor & Zafman

[57] ABSTRACT

A magnetic deflection amplifier implemented using a linear amplifier connected to a first side of a deflection coil and a three pole switch connected to a second side of the deflection coil. The three pole switch connects the coil to ground during the active scan and connects the coil to a positive or negative high voltage rail depending of the polarity of the retrace current resulting in fast retrace time and reduced voltage requirements on the linear amplifier.

4 Claims, 4 Drawing Sheets

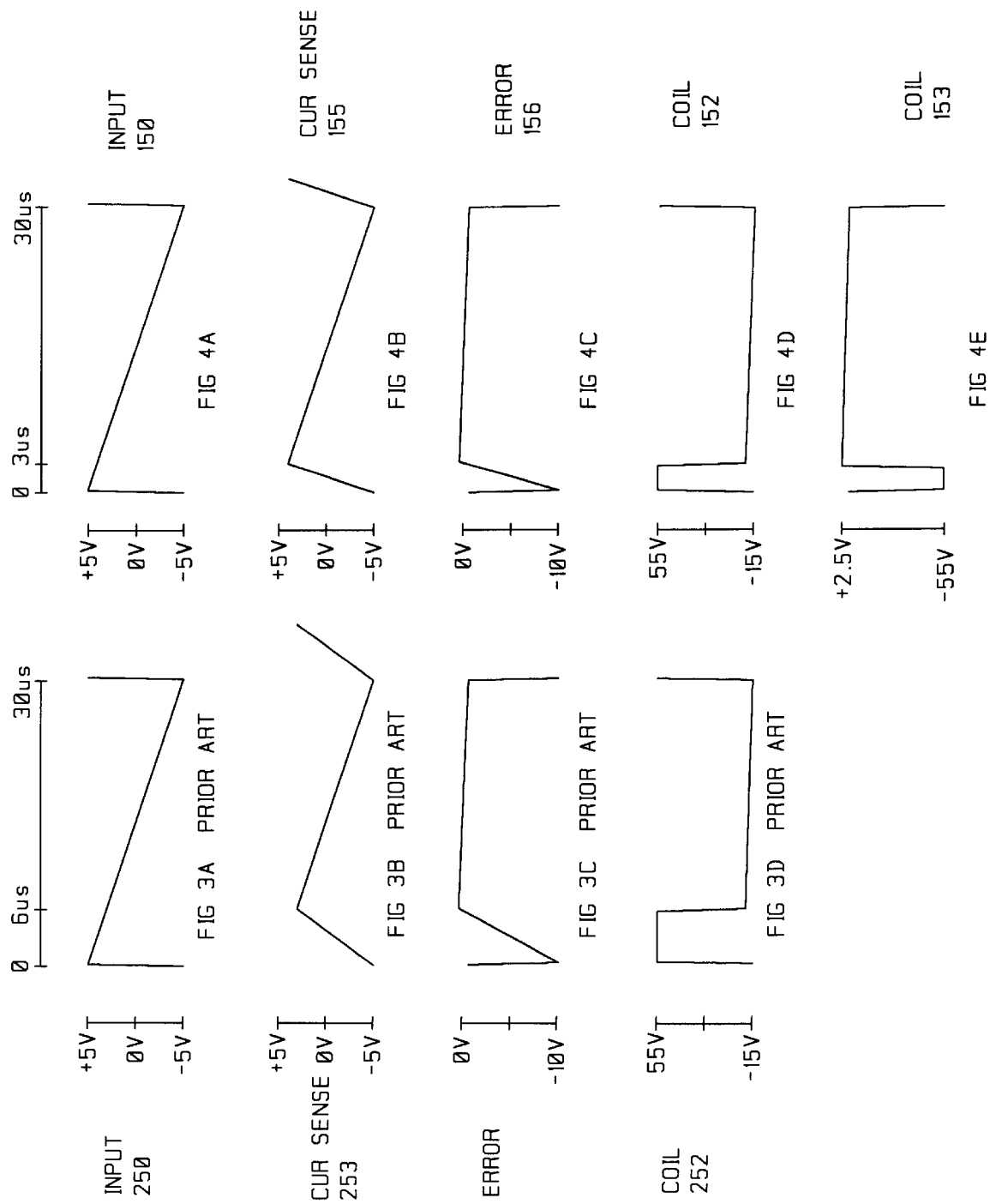

HYBRID BRIDGE MAGNETIC DEFLECTION AMPLIFIER

FIELD OF THE INVENTION

This invention has application in magnetic deflection systems where fast retrace and flexible scanning is required. Telecines are one such application. Telecine machines convert images from motion picture film to video information.

BACKGROUND OF THE INVENTION

In flying spot telecines, light from a Cathode Ray Tube (CRT) is used to scan information from motion picture film. Each location on the CRT corresponds to a point on the film. To make a video signal representing the information on the film, a raster is generated on the CRT. Film modulated light from the CRT is picked up by light sensors and converted to electrical video signals. Zoom is accomplished by changing the size of the CRT raster. Pans are done by applying horizontal offsets and tilts are accomplished by applying vertical offsets to the scanning raster. Flips are done by inverting the direction of the vertical or horizontal component of the raster. Rotate is accomplished by cross coupling a portion of the horizontal and vertical scans as a function of the desired angle. The telecine deflection system must quickly adapt to the frame to frame changes in scanning parameters. This requirement prevents the use of highly efficient resonant deflection systems since resonant deflection systems normally do not respond to changes at the speed required by telecines.

It is customary to use magnetic deflection to deflect the electron beam in the telecine. Today, a typical telecine has a two channel high power deflection amplifier. The two channels are substantially identical and each drive one axis of the deflection yoke. The deflection yoke is typically made up of two coils of similar inductance and sensitivity. Coil inductance of 27 $\mu$H to 30 $\mu$H is common. For the rotate function to perform well, it is desirable to have the horizontal and vertical channels similar in performance and both need to be fast. This is quite different than a typical television or computer monitor deflection system where the horizontal and vertical deflection channels are usually much different. This is because the vertical channel is typically low speed on a television or monitor. Typically vertical is running at about 60 Hz and horizontal is 15 kHz to 100 kHz and there is little or no rotate needed.

The voltage required across a deflection coil is a function of the coil inductance multiplied by the rate of change of the desired current through the coil. To make a raster, a triangle wave is typically generated on each scan channel. At the end of each scan line the current must change rapidly to bring the beam back to the start of the next line. This rapid change in current requires a large voltage across the coil. For standard definition telecines it is common to use a 21 kHz horizontal scanning rate with a retrace time about 8 vS. However, for high definition (HDTV) telecines, since there are more horizontal scan lines (e.g., 1080 vs. 486 in standard definition NTSC systems), more lines need to be scanned per frame of video information. If the vertical rate is the same and more lines are needed, the horizontal rate needs to increase. This normally reduces the retrace time. If a frame store is used, it is possible to keep the same retrace time but at the expense of a higher video sample rate and extra bandwidth required in the video path. The deflection amplifiers need to be able to handle the extra fast retrace time required by HDTV. Without changing the deflection coil, this requires higher voltages during retrace.

The coil voltage requirements can be reduced by lowering the inductance, but the coil will be less sensitive so more current is needed. However, the increased current has an undesired side effect of adding more spot spread in the deflection process. This effectively lowers the overall telecine resolution.

Faster retrace time can be accomplished by simply increasing the power supply voltage on the deflection amplifier. However, the increase in voltage typically causes problems with power dissipation and voltage breakdown on the amplifier semiconductors.

The rate of change of the coil current during the active scan retrace is much lower than during retrace. This corresponds to lower voltage requirements during active scanning. In a linear amplifier with fixed power supplies, the power dissipation is great during active scan. It is well known that a higher voltage can be switched to the coil during retrace to decrease the retrace time while maintaining good efficiency.

U.S. Pat. No. 3,983,452 ("Brazin") and U.S. Pat. No. 4,262,235 ("Neves") describe this approach. Both these patents switch in a higher voltage during retrace. Neves uses a one shot to control the width of the high voltage pulse. This would not function well in an application, such as a telecine where the retrace pulse width would need to change based on the rate of change in current caused by user controls such as zoom, rotate, etc. Brazin's approach couples the high voltage switch to a difference amplifier which would respond better to changes in scanning. Both these approaches would not work in telecine applications where flips are used. Rotate and flip can invert the scan so the high voltage during retrace would need to have the capability of being either polarity.

U.S. Pat. No. 4,164,688 ("Cushing") describes a pair of high voltage switches, one connected to a positive high voltage source and the other to a negative high voltage source. The diodes D1 and D2 have the potential for causing crossover distortion as the current crosses over zero volts. The linear amplifier output transistors need to be able to withstand the high voltage plus the lower supply rail. This would limit the maximum high voltage used or require tradeoffs in transistor selection. Typically high power transistors optimized for linear operation and that withstand high voltages, are not available.

FIG. 2 shows a conventional grounded load deflection amplifier. Input signal 250 represents the desired deflection current for any point in time. Amplifier 201 converts the input 250 to a current through the deflection coil 210. Current sense resistor 211 provides a feedback signal 253 to amplifier 201. FIGS. 3A through 3D show the various waveforms present in the circuit. FIG. 3A shows a typical input waveform. FIG. 3B shows the voltage 253 at the sense resistor 211 representing the actual current being delivered to the coil 210. Note that the actual current waveform is different than the input waveform. This is do to the finite amount of voltage available in a practical amplifier. FIG. 3C shows the difference between input 250 and the current sense signal 253. FIG. 3D shows the voltage 252 at the coil. During retrace coil voltage 252 rapidly assumes the maximum value amplifier 201 can supply. At the end of retrace eventually it will drop down to a voltage defined by the inductance of the coil, the rate of change of the current and the value of the sense resistor. This voltage V is described by equation 1 below. The coil inductance L is in Henrys, current I in Amps, time t in Seconds and resistance R is in Ohms.

$$V = I \cdot R + L \cdot \frac{dI}{dt} \qquad \text{Equation 1}$$

If the input wave shown in FIG. 3A is inverted, all the waveforms shown in FIGS. 3B through D also will be inverted.

SUMMARY OF THE INVENTION

The present invention has a linear deflection amplifier connected to one side of a deflection coil and a three pole switch on the other side of the coil in a bridge configuration. The three pole switch connects the coil to ground during the active scan and connect the coil to the positive or negative high voltage rail depending of the polarity of the retrace current. This approach has the advantage of isolating the high voltage side of the coil from the low voltage side. The linear amplifier on the low voltage side of the coil also contributes to the voltage across the coil during retrace, effectively reducing the voltage required on the high voltage switch.

BRIEF DESCRIPTION OF THE DRAWINGS

FIGS. 3a–3d illustrates waveforms produced by a prior art circuit of the type shown in FIG. 2.

FIGS. 4a–4e illustrate waveforms produced by a circuit of the type shown in FIG. 1.

DETAILED DESCRIPTION OF THE INVENTION

Figure 1:
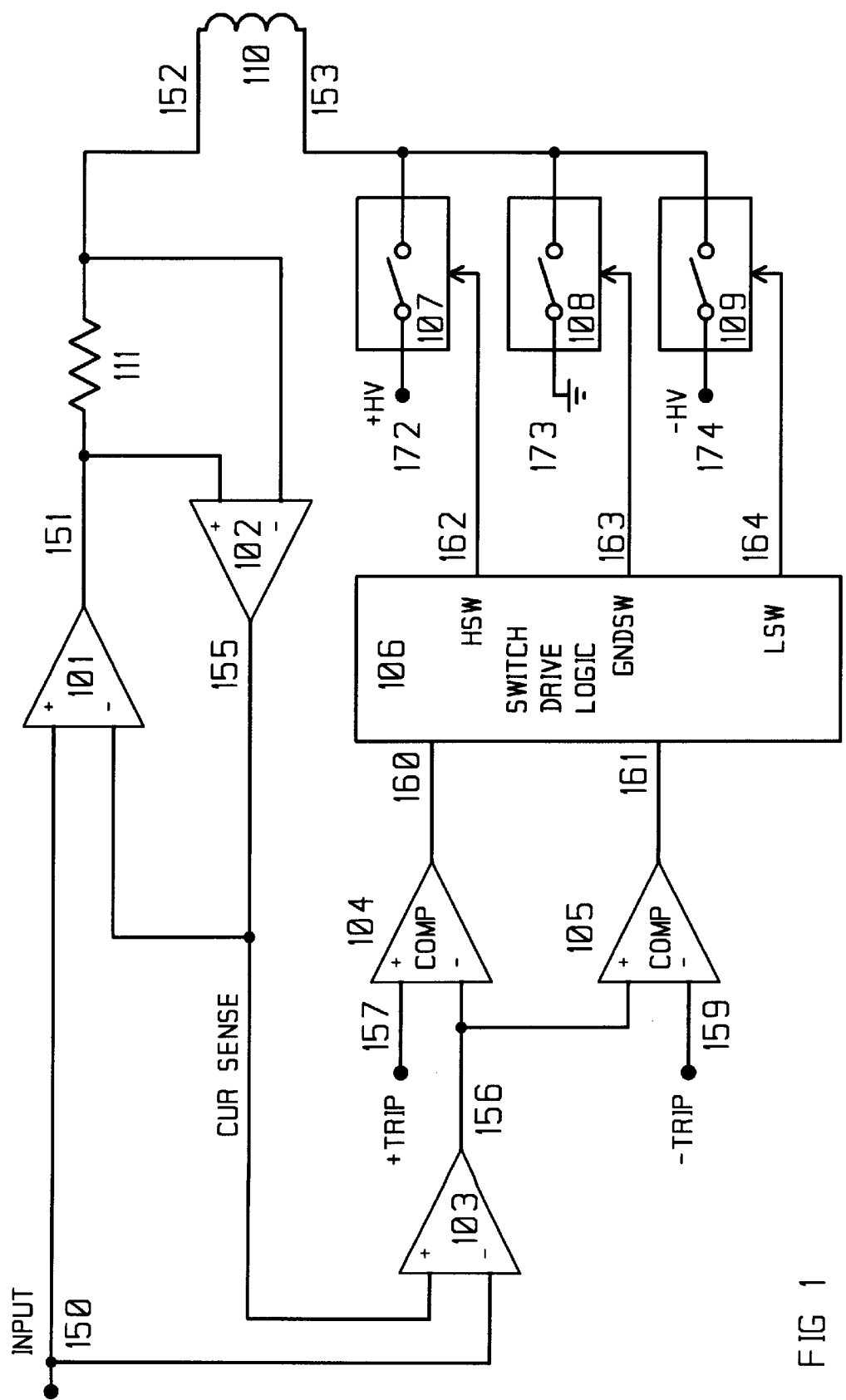
FIG. 1 is a block diagram of the present invention.
Figure 2:
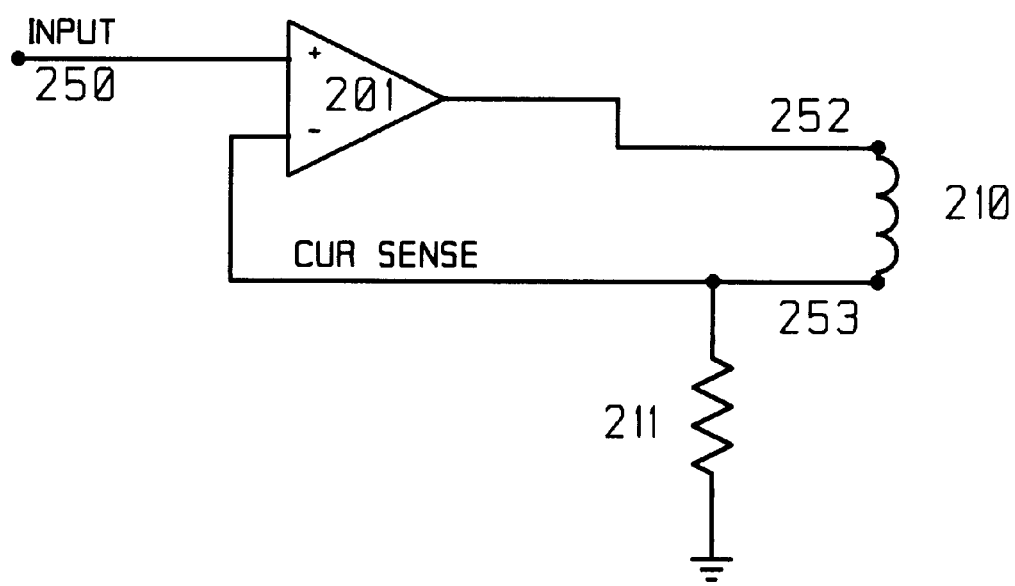
FIG. 2 is a block diagram of a circuit corresponding to the prior art.

FIG. 1 is a block diagram of the current invention for a deflection coil for one axis. The circuit for a second axis, as would be needed in a telecine application, would be identical. Input signal 150 represents the desired deflection current for any point in time. Similar to amplifier 201, amplifier 101 converts the signal at 150 to a current through deflection coil 110. Current sense resistor 111 connects to the output of amplifier 101 at 151 and to the coil terminal 152 to provide a signal representing the coil current to amplifier 102. Amplifier 102 connects across resistor 111 to provide amplifier 101 and amplifier 103 with a signal 155 representing the coil current. Current sense signal 155 and input signal 150 also feed error amplifier 103. Amplifier 103 provides a signal 156 representing the difference between the desired coil current and the actual coil current. Signal 156 is shown in FIG. 4C. Error signal 156 is connected to two comparators 104 and 105. Comparator 104 receives the error signal 156 and a fixed trip threshold value 157 and generates a signal 160 indicating if the error signal 156 is greater than the fixed trip threshold 157. Comparator 105 receives the error signal 156 and a fixed trip threshold value 159 and generates a signal 161 indicating if the error signal 156 is more negative than the fixed trip threshold 159. Switch drive logic 106 receives signals 160 and 161 and generates three independent switch drive signals 162, 163 and 164. During active scanning the error voltage 156 will be lower than (between) the two trip thresholds 157 and 159 so signals 160 and 161 will not be asserted. In this condition, the logic 106 will activate ground switch signal 163 and deactivate high switch signal 162 and low switch signal 164.

In the case where input waveform is positive going of sufficient amplitude during retrace, error signal 156 will be more negative than the negative trip threshold 159. See FIG. 4C. This will cause the comparator 105 to assert signal 161 and comparator 104 will not assert signal 160. When signal 161 is asserted, switch drive logic 106 will deactivate ground switch signal 163 and will activate low switch drive signal 164. This will disconnect coil terminal 153 from ground 173 through switch 108 and connect coil terminal 153 to negative potential –HV 174 through switch 109. The voltage applied to coil terminal 153 will cause the coil current to more rapidly approach the desired current compared to the conventional amplifier where the coil is substantially at ground potential. When the error voltage 156 becomes more positive than the negative trip threshold 159, comparator 105 will de-assert signal 161. When signal 161 and 160 are both not asserted, logic 106 will de-assert switch drive signals 162 and 164 and will assert ground switch drive signal 163. This will connect coil terminal 153 to ground 173 through switch 108.

In the case where input wave form is negative going of a sufficient amplitude during retrace, error signal 156 will be more positive than the positive trip threshold 157. This will cause the comparator 104 to assert signal 160 and comparator 105 will not assert signal 161. When signal 160 is asserted, switch drive logic 106 will deactivate ground switch signal 163 and will activate high switch drive signal 162. This will disconnect coil terminal 153 from ground 173 and connect coil terminal 153 to positive potential +HV 172 through switch 107. When the error voltage 156 becomes less than the positive trip threshold 157, comparator 104 will de-assert signal 160. When signal 161 and 160 are both not asserted, logic 106 will de-assert switch drive signals 162 and 164 and will assert ground switch drive signal 163. This will connect coil terminal 153 to ground 173 through switch 108.

FIGS. 4A through 4E show the various waveforms present in the invention. FIG. 4A shows a typical input waveform. FIG. 4B shows the voltage 155 at the output of current sense amplifier 102 representing the actual current being delivered to the coil 110. FIG. 4C shows the difference between input 150 and the current sense signal 155. FIG. 4D shows the voltage at the coil terminal 152. During retrace, coil voltage 152 rapidly assumes the maximum voltage amplifier 101 can supply less a small voltage drop across resistor 111. FIG. 4E shows the voltage at coil terminal 153. Due to the on resistance of switch 108 there will be a small voltage at terminal 153 during the active scan. FIG. 4E shows a high voltage of 55V, which is the same as the low voltage 152 on the other side of the coil. This was done to show that the retrace time would be halved compared to the standard amplifier if the high voltage was the same as the low voltage used by amplifier 101. The actual voltages used would depend on the application. The low voltage on amplifier 101 is determined by the coil inductance, sense resistance, maximum current and the maximum current rate of change. The high voltage is determined by the retrace time required.

The invention may be constructed with many different types of components but it has been found that some portions of the invention are more critical than others. The current sense resistor 111 should be of a low inductance type such as the PBV series from Isoplan of Germany. Two 1 ohm 10 w resistors in parallel work well. The current sense amplifier 102 should have good common mode rejection and also good high frequency characteristics. Part number AD830AN from Analog Devices is well suited for this application. The AD830AN has a maximum common mode input voltage of about 12V. If the output voltage of amplifier 101 exceeds 12V, two simple resistor dividers can be used to scale the input signals to the amplifier 102. The amplifier 101 can be made with part number PA85 or PA19 from Apex Microtechnology. Current gain can be accomplished by using parallel NPN and PNP transistors in a typical emitter follower configuration using Sanken 2SC2922 and 2SA1216 parts. The switch drive logic 106 can be implemented with a PALCE16V8-15PC/4 from Vantis corp. An extremely fast optocoupler part number HCPL-7101 from Hewlett Packard can be used to provide isolation between the low voltage logic and the high voltage switch drives. A P-channel MOSFET type IRFP9240 can be used for the switch 107 and a N-channel MOSFET type IRFP240 can be used for the switch 109. If the application requires high voltage greater than 100V a 500V P-channel MOSFET part number IXTH11P50 is available from IXYS for use as switch 107. 500V N-channel MOSFETS are readily available from many sources. The grounding switch 108 can be made with two IRFP360 MOSFETs in a configuration where the two sources are connected together with one drain grounded and the other drain connected to coil terminal 153. The above MOSFETs are available from International Rectifier. FET driver type TC4425CPA from Telcom Semiconductor are well suited to driving the MOSFETs above. Comparators 104 and 105 can be type AD790 from Analog Devices.

To prevent very short duration current peaks, the switch drive logic can be configured in a traditional break before make manner. This would de-assert ground switch drive signal 163 for a few tens of nanoseconds before either drive signals 162 or 164 are asserted and delay re-assertion of ground drive signal 163 a short period after either drive signals 162 or 164 are de-asserted. A simple R-C time constant into a 74ACT14 inverter can make such a delay. It was found that there was a capacitive coupling effect between the two coils in the deflection yoke. The 27 $\mu$H coil had about 400 pF between the two coils. The fast rise times applied to the coil could cross couple to the amplifier on the other coil causing a ringing effect. This can be solved by clamping an EMI filter over the two wires going to each coil. This will suppress this common mode voltage. Part number 0443164251 from Fair-rite can be used. One filter per coil is sufficient.

The positive trip threshold 157 and negative trip threshold 159 can be a fixed voltage set by a voltage reference. The actual values are implementation dependent. They should be high enough to prevent false triggering during active scan and low enough to not unnecessarily delay the triggering of the high voltage during retrace. The trip thresholds can be made adjustable or the gain on the error amplifier 103 can be made adjustable. The thresholds or the 103 gain should be adjusted so that there is minimum overshoot on the error signal 156. Overshoot is caused by the high voltage switch being on for too long. Any practical design will have some finite delay from the comparator outputs 160 and 161 to the switched voltage at coil terminal 153. This delay could cause a slight increase in the total retrace time. In most applications this would not be a problem. In an alternate embodiment, a second set of comparators can be used to trigger on the high voltage switches and another set of comparators could trigger off the high voltage switch. This would allow different trigger points for on and off and would reduce problems caused by the propagation delays. Alternately a system sync signal such as a horizontal sync signal could be used to trigger the switch on with the comparators 104 and 105 triggering the switch off at the end of retrace.

In another alternate embodiment, a circuit could compute the difference in current required during retrace to generate a trigger pulse to the switch drive logic. In a digital scan application, this could be done when the scans are in a digital form before they are converted into analog scan signals so the trigger would be precise and not be delayed relative to the scans. The trigger could be generated digitally by a sample by sample subtraction and comparing the result with a threshold reference. In an alternate embodiment amplifier 103 can be eliminated and the error signal 156 would come from 151, the output of amplifier 101.

Figure 5:
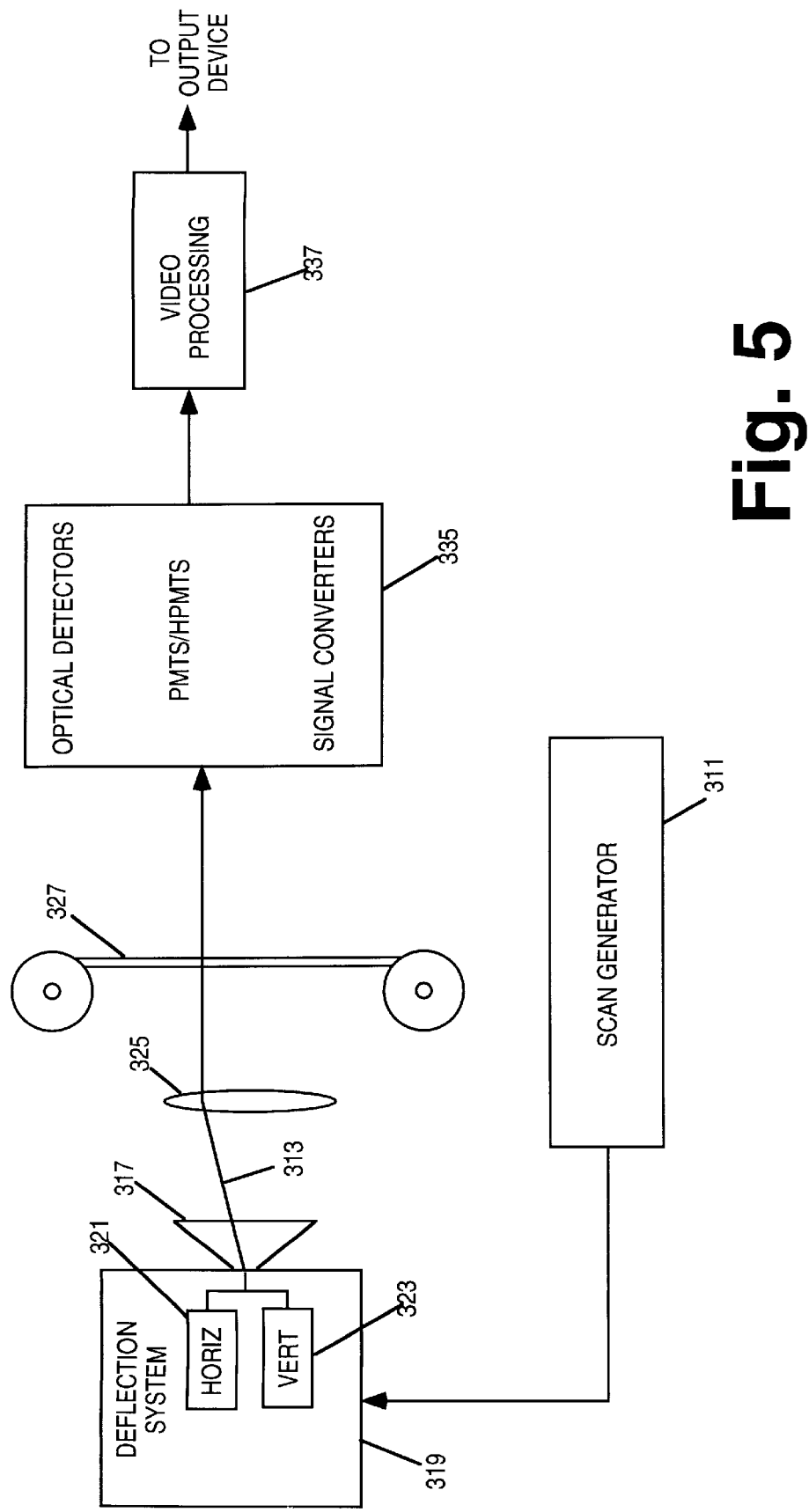
FIG. 5 is a system block diagram of a telecine apparatus in conjunction with which the present invention may be used.

FIG. 5 is a block diagram of a telecine system in which the present invention may be used. In a telecine system, scan generator 311 generates a signal which represents the coordinates of a beam 313 produced by a CRT 317 under control of a deflection system 319. Horizontal deflection circuit 321 and vertical deflection circuit 323 control the placement of beam 313 which is focused by lens 325 onto film 327. The beam passes through film 327 as modified by its passing through film 327 onto optical detectors, Photo Multiplier Tubes (PMTs) or Hybrid Photo Multiplier Tubes HPMTs and signal converters 335 which convert the beam into a signal suitable for use by video processing block 337 which produces a standard video signal which can then be stored on video tape or sent to a video display device. The various elements shown in FIG. 5 are all well known in the art. Horizontal deflection circuit 321 and vertical deflection circuit 323 are implemented according to the teachings of the present invention to provide a telecine system suitable for applications where fast retrace is required such as converting film to a video signal suitable for HDTV play. PMTs can be model R3256 from Hamamatsu and HPMTs can be PP0270 model from Delft Instruments.

We claim:

1. A circuit to cause current to flow in a deflection coil as a function of an input signal representing a desired current flowing through said deflection coil, said circuit comprising:
    a) a differential amplifier providing a signal representing the difference between said desired current and the actual current flowing through said deflection coil with said first differential amplifier output coupled to a first terminal of said deflection coil with one said differential amplifier input responsive to said input signal;
    b) current sense means providing a signal to said differential amplifier producing a signal representing the actual current flowing through said deflection coil;
    c) switch means for coupling to a second terminal of said deflection coil, one of a first voltage, a second voltage and a third voltage, wherein said first voltage has a positive potential, said second voltage has a potential substantially at ground and a third voltage has a negative potential;
    d) a first comparator coupled to said differential amplifier and a first trip threshold voltage value;
    e) a second comparator coupled to said differential amplifier and a second trip threshold voltage value;
    f) switch drive logic coupled to said first and second comparators and said switch means operable to select one of said three switch potentials responsive to output signals provided by said first and second comparators.

2. A circuit to cause current to flow in a deflection coil as a function of an input signal representing a desired current flowing through said deflection coil, said circuit comprising:
    a) a first differential amplifier providing a signal representing the difference between said desired current and the actual current flowing through said deflection coil with said first differential amplifier output coupled to a first terminal of said deflection coil coupled through a series current sense resistor with one said differential amplifier input responsive to said input signal;

b) current sense means comprising a second differential amplifier coupled to said current sense resistor providing a signal to said first differential amplifier producing a signal representing the actual current flowing through said deflection coil;

c) switch means for coupling to a second terminal of said deflection coil, one of a first voltage, a second voltage and a third voltage, wherein said first voltage has a positive potential, said second voltage has a potential substantially at ground and a third voltage has a negative potential;

d) a first comparator coupled to said first differential amplifier and a first trip threshold voltage value;

e) a second comparator coupled to said first differential amplifier and a second trip threshold voltage value;

f) switch drive logic coupled to said first and second comparators and said switch means operable to select one of said three switch potentials responsive to output signals provided by said first and second comparators.

3. A circuit to cause current to flow in a deflection coil as a function of an input signal representing a desired current flowing through said deflection coil, said circuit comprising:

a) a first differential amplifier providing a signal representing the difference between said desired current and the actual current flowing through said deflection coil with said first differential amplifier output coupled to a first terminal of said deflection coil coupled through a series current sense resistor with one said differential amplifier input responsive to said input signal;

b) current sense means comprising a second differential amplifier coupled to said current sense resistor providing a signal to said first differential amplifier producing a signal representing the actual current flowing through said deflection coil;

c) switch means for coupling to a second terminal of said deflection coil, one of a first voltage, a second voltage and a third voltage, wherein said first voltage has a positive potential, said second voltage has a potential substantially at ground and a third voltage has a negative potential;

d) a third differential amplifier providing a signal which represents the difference between said desired current and the actual current flowing through said deflection coil;

e) a first comparator coupled to said third differential amplifier and a first trip threshold voltage value;

f) a second comparator coupled to said third differential amplifier and a second trip threshold voltage value;

g) switch drive logic coupled to said first and second comparators and said switch means operable to select one of said three switch potentials responsive to output signals provided by said first and second comparators.

4. A circuit to cause current to flow in a deflection coil as a function of an input signal representing a desired current flowing through said deflection coil, said circuit comprising:

a) a first differential amplifier providing a signal representing the difference between said desired current and the actual current flowing through said deflection coil with said first differential amplifier output coupled to a first terminal of said deflection coil coupled through a series current sense resistor with one said differential amplifier input responsive to said input signal;

b) current sense means comprising a second differential amplifier coupled to said current sense resistor providing a signal to said first differential amplifier producing a signal representing the actual current flowing through said deflection coil;

c) switch means for coupling to a second terminal of said deflection coil, one of a first voltage, a second voltage and a third voltage, wherein said first voltage has a positive potential, said second voltage has a potential substantially at ground and a third voltage has a negative potential;

d) trigger logic means for determining when the rate of change in said desired deflection current exceeds preset positive and negative limits;

e) switch drive logic coupled to said trigger logic and said switch means operable to select one of said three switch potentials responsive to determinations made by said trigger logic.

* * * * *